(12) United States Patent
Calmettes-Carensac

(10) Patent No.: US 10,862,188 B2
(45) Date of Patent: Dec. 8, 2020

(54) POSITIONING DEVICE

(71) Applicant: THALES, Courbevoie (FR)

(72) Inventor: Fabien Calmettes-Carensac, Toulouse (FR)

(73) Assignee: THALES, Courbevoie (FR)

( * ) Notice: Subject to any disclaimer, the term of this patent is extended or adjusted under 35 U.S.C. 154(b) by 1 day.

(21) Appl. No.: 16/360,745

(22) Filed: Mar. 21, 2019

(65) Prior Publication Data

US 2019/0296418 A1 Sep. 26, 2019

(30) Foreign Application Priority Data

Mar. 22, 2018 (FR) ...................................... 18 00240

(51) Int. Cl.

| | |
|---|---|
| *F16M 11/14* | (2006.01) |
| *H01Q 1/12* | (2006.01) |
| *G02B 7/183* | (2006.01) |
| *H01Q 1/28* | (2006.01) |
| *H02N 2/04* | (2006.01) |

(Continued)

(52) U.S. Cl.
CPC ............. *H01Q 1/125* (2013.01); *F16H 21/40* (2013.01); *F16M 11/12* (2013.01); *F16M 11/18* (2013.01); *G02B 7/183* (2013.01); *H01Q 1/288* (2013.01); *H01Q 3/08* (2013.01); *H02N 2/0095* (2013.01);

(Continued)

(58) Field of Classification Search
CPC combination set(s) only.
See application file for complete search history.

(56) References Cited

U.S. PATENT DOCUMENTS

| | | | | |
|---|---|---|---|---|
| 9,263,797 | B1* | 2/2016 | Hall | .......................... H01Q 3/02 |
| 9,647,334 | B2* | 5/2017 | Lanciault | ................. H01Q 3/20 |

(Continued)

FOREIGN PATENT DOCUMENTS

EP 2 816 723 A1 12/2014

*Primary Examiner* — Monica E Millner
(74) *Attorney, Agent, or Firm* — BakerHostetler

(57) ABSTRACT

A positioning device includes a chassis, a plate to be positioned, wherein it further comprises a motor comprising a stator which is connected to the chassis and a rotor, a shaft which is connected to the rotor driven by the motor, which is mobile in rotation relative to the chassis in a first direction and in a second direction opposing the first direction, a first element for the transmission of rotational movement which is configured to be driven in rotation by the shaft in the first direction and to be free in the second direction, a second element for the transmission of rotational movement which is configured to be driven in rotation by the shaft in the second direction and to be free in the first direction, a first connecting rod which is connected to the plate by a first pivot connection and which is connected to the first element for the transmission of rotational movement by a second pivot connection which is offset to the axis of rotation of the first element for the transmission of rotational movement, a second connecting rod which is connected to the plate by a third pivot connection and which is connected to the second element for the transmission of rotational movement by a fourth pivot connection which is offset to the axis of rotation of the second element for the transmission of rotational movement, a connecting element having at least two degrees of rotational freedom between the plate and the chassis.

13 Claims, 7 Drawing Sheets

(51) Int. Cl.
 *F16M 11/12* (2006.01)
 *F16H 21/40* (2006.01)
 *H01Q 3/08* (2006.01)
 *H02N 2/00* (2006.01)
 *F16M 11/18* (2006.01)

(52) U.S. Cl.
 CPC ............ H02N 2/043 (2013.01); H02N 2/046 (2013.01); *F16M 11/14* (2013.01)

(56) References Cited

U.S. PATENT DOCUMENTS

| | | | |
|---|---|---|---|
| 10,008,977 B2* | 6/2018 | Tamaura | G05D 3/105 |
| 2008/0258988 A1* | 10/2008 | Son | H01Q 19/10 |
| | | | 343/765 |
| 2010/0180883 A1* | 7/2010 | Oosting | F24S 50/20 |
| | | | 126/574 |
| 2011/0043433 A1 | 2/2011 | Klien | |
| 2011/0241971 A1* | 10/2011 | Bateman | H01Q 1/125 |
| | | | 343/882 |
| 2013/0008489 A1* | 1/2013 | Luo | F24S 30/455 |
| | | | 136/251 |
| 2013/0175420 A1* | 7/2013 | Dror | F16M 11/18 |
| | | | 248/371 |
| 2014/0174214 A1 | 6/2014 | Horth et al. | |
| 2016/0233579 A1* | 8/2016 | Oppenlaender | H01Q 21/28 |

\* cited by examiner

POSITIONING DEVICE

CROSS-REFERENCE TO RELATED APPLICATIONS

This application claims priority to foreign French patent application No. FR 1800240, filed on Mar. 22, 2018, the disclosure of which is incorporated by reference in its entirety.

FIELD OF THE INVENTION

The invention relates to a positioning device which is designed to position an instrument such as an antenna, a reflector or any payload. Whilst the invention is applicable in the space sector, it applies to various other sectors such as the navigation or positioning of any instrument relative to another. A space application of the invention will be taken as an example.

BACKGROUND

In space applications it is necessary to be able to orientate specific elements of a satellite or space vehicle, such as an antenna or a reflector, in a predetermined direction, for example in order to direct them toward a fixed star, to keep them pointing toward a location on the surface of the earth or even to scan a specific zone on the surface of the earth or any star. The positioning of an instrument has to be carried out ideally over all of the earth by minimizing the weight, the number of actuators and its associated wire strands.

Nowadays, positioning devices which are composed of two motors positioned at 90° are available, the second motor being mounted on the first motor. This type of device is certainly accurate and robust but it requires two rotating actuators which represent increased weight and cost. Moreover, this solution involves having to control the wire strands of two motors. This is problematical in the case of using a panel having a plurality of reflectors due to the fact that a resistant torque is generated by the wire strands when the panel is deployed. Moreover, this solution also requires two motor control circuit boards which contributes to the additional weight and costs. Finally, as the supply cables of the two motors have to pass through the axes of rotation, at the root, the cable strand affects the motorisation margin.

A further positioning device of the prior art comprises two motors positioned at 90°, connecting rods which are connected to the reflector being mounted on said motors. This solution has the same drawbacks as the above solution. More specifically, the need for two motors involves increased weight and cost due to the presence of two motors and two motor control circuit boards. Moreover, the wire strands of the two motors are difficult to control.

A further positioning device of the prior art uses linear actuators which pull and/or push the reflector. This type of mechanism is known by the term "push/pull". In addition to the drawbacks cited above of increased weight and cost, with two actuators and two control circuit boards and the problem of controlling the wire strands, this solution only provides a small swing of +/−1.5°.

SUMMARY OF THE INVENTION

The invention aims to remedy all or some of the problems cited above by proposing a positioning device comprising a single motor in order to orientate an instrument along two axes. The invention has the advantage of reducing the number of mechanisms used and reducing the number of motor control circuit boards (a gain in competitiveness and in weight) and reducing the size of the electrical harness, thus reducing the restrictions on the deployable structures bearing the mobile antennae and on the deployment mechanisms. This solution represents a gain in cost and weight of approximately 20% relative to the solutions of the prior art.

To this end, the subject of the invention is a positioning device comprising a chassis, a plate to be positioned, a motor comprising a stator which is connected to the chassis and a rotor, a shaft which is connected to the rotor driven by the motor, which is mobile in rotation relative to the chassis in a first direction and in a second direction opposing the first direction, a first element for the transmission of rotational movement which is configured to be driven in rotation by the shaft in the first direction and to be free in the second direction, a second element for the transmission of rotational movement which is configured to be driven in rotation by the shaft in the second direction and to be free in the first direction, a first connecting rod which is connected to the plate by a first pivot connection and which is connected to the first element for the transmission of rotational movement by a second pivot connection which is offset to the axis of rotation of the first element for the transmission of rotational movement, a second connecting rod which is connected to the plate by a third pivot connection and which is connected to the second element for the transmission of rotational movement by a fourth pivot connection which is offset to the axis of rotation of the second element for the transmission of rotational movement, a connecting element having at least two degrees of rotational freedom between the plate and the chassis.

Advantageously, the first element for the transmission of rotational movement comprises a first freewheel and the second element for the transmission of rotational movement comprises a second freewheel.

According to a further embodiment, the positioning device comprises a third element for the transmission of rotational movement which is connected to the first element for the transmission of rotational movement such that the rotation of the first element for the transmission of rotational movement in the first direction drives the third element for the transmission of rotational movement in rotation, a fourth element for the transmission of rotational movement which is connected to the second element for the transmission of rotational movement such that the rotation of the second element for the transmission of rotational movement in the second direction drives the fourth element for the transmission of rotational movement in rotation and the first connecting rod connects the plate to the first element for the transmission of rotational movement by means of the third element for the transmission of rotational movement and the second connecting rod connects the plate to the second element for the transmission of rotational movement by means of the fourth element for the transmission of rotational movement.

Advantageously, the third element for the transmission of rotational movement has a first reduction ratio relative to the first element for the transmission of rotational movement and the fourth element for the transmission of rotational movement has a second reduction ratio relative to the second element for the transmission of rotational movement.

Advantageously, the first reduction ratio and the second reduction ratio are identical.

Advantageously, the connecting element is a finger ball joint.

Advantageously, a first axis passing through the centre of the third element for the transmission of rotational movement and the centre of the connecting element and a second axis passing through the centre of the fourth element for the transmission of rotational movement and the centre of the connecting element intersect in a substantially perpendicular manner.

According to a further embodiment, the first and the third elements for the transmission of rotational movement are pinions, the third element for the transmission of rotational movement meshing with the first element for the transmission of rotational movement such that the rotation of the first element for the transmission of rotational movement in the first direction drives the third element for the transmission of rotational movement in rotation.

According to a further embodiment, the second and the fourth elements for the transmission of rotational movement are pinions, the fourth element for the transmission of rotational movement meshing with the second element for the transmission of rotational movement such that the rotation of the second element for the transmission of rotational movement in the second direction drives the fourth element for the transmission of rotational movement in rotation.

According to a further embodiment, the first and the third elements for the transmission of rotational movement are pulleys, the third element for the transmission of rotational movement being connected to the first element for the transmission of rotational movement by a first belt such that the rotation of the first element for the transmission of rotational movement in the first direction drives the third element for the transmission of rotational movement in rotation in the first direction.

According to a further embodiment, the second and the fourth elements for the transmission of rotational movement are pulleys, the fourth element for the transmission of rotational movement being connected to the second element for the transmission of rotational movement by a second belt, such that the rotation of the second element for the transmission of rotational movement in the second direction drives the fourth element for the transmission of rotational movement in rotation in the second direction.

Advantageously, the plate extends substantially in one plane and a third axis substantially perpendicular to the first and second axes passing through the connecting element intersects the plate substantially at its centre.

The invention further relates to any space equipment comprising a positioning device such as described in this application.

BRIEF DESCRIPTION OF THE DRAWINGS

The invention will be more clearly understood and further advantages will become apparent from reading the detailed description of an embodiment given by way of example, the description being illustrated by the accompanying drawing, in which.

For reasons of clarity, the same elements will bear the same reference numerals in the various figures.

DETAILED DESCRIPTION

In the description of the present application, the invention is described within the scope of a space application. As mentioned above, the invention is applicable to any other technical sector which requires the use of a positioning device of any instrument. The invention also applies to the implementation of a relative movement of an object with regard to another object, for example the opening and closing of a shroud.

Figure 1:
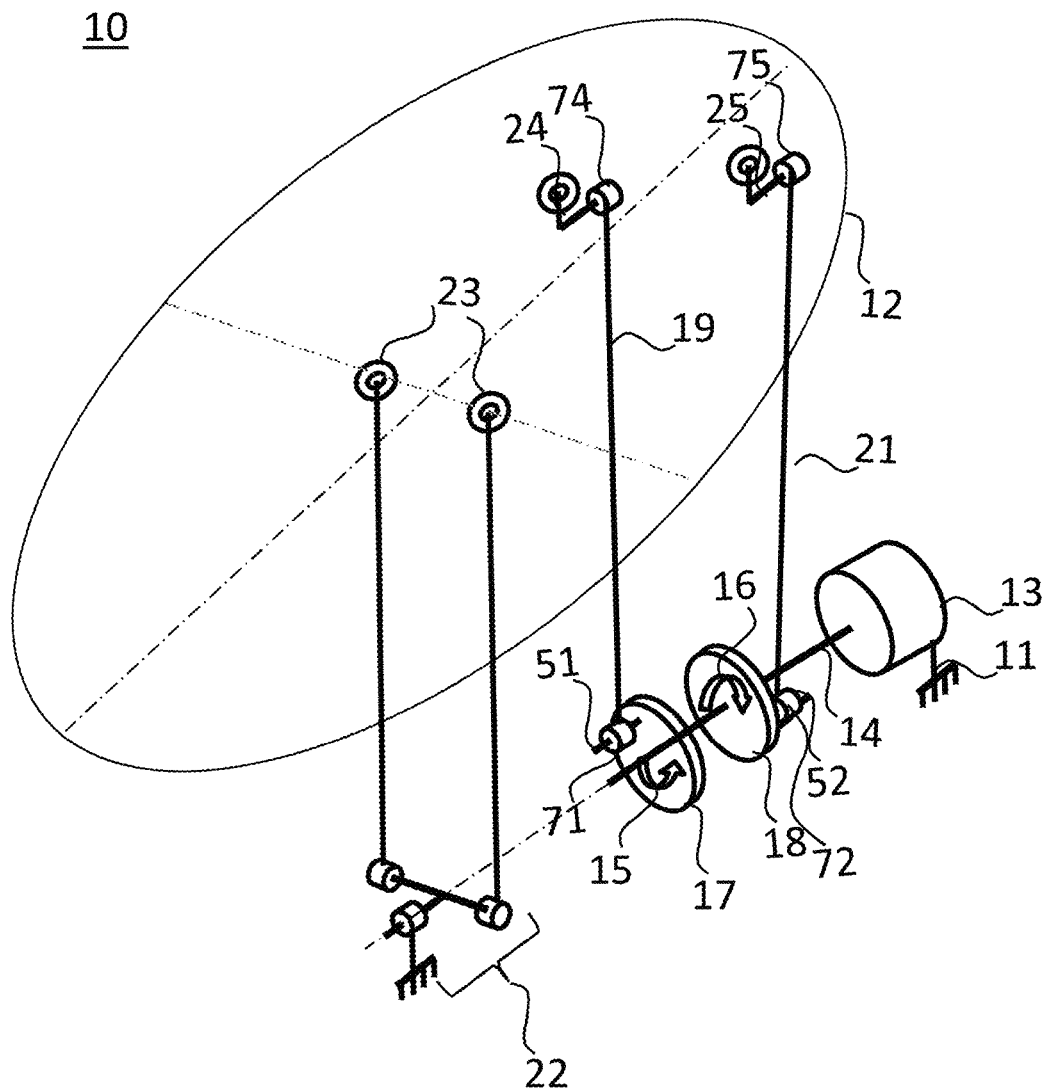
FIG. 1 shows a first embodiment of a positioning device according to the invention.

FIG. 1 shows a first embodiment of a pointing device 10 of the pointing assembly according to the invention. The pointing device 10 is designed to position and orientate an instrument in a predetermined direction. Within the context of a space application, the instrument is positioned on a plate 12 and may, for example, be an antenna which is desired to be pointed toward a specific location on the surface of the earth, or a reflector. The invention further relates to the opening and closing of a part such as a shroud, in which case the plate 12 which may be oriented represents the shroud. In the description the reference 12 refers to the plate which bears an instrument in the given example but it may also act directly on the instrument, antenna or reflector.

The positioning device 10 comprises a chassis 11 and the plate 12 to be positioned. According to the invention, the positioning device further comprises a motor 13 comprising a stator which is connected to the chassis and a rotor, a shaft 14 which is connected to the rotor driven by the motor 13 which is mobile in rotation relative to the chassis 11 in a first direction 15 and in a second direction 16 opposing the first direction 15, a first element for the transmission of rotational movement 17 which is configured so as to be driven in rotation by the shaft 14 in the first direction 15 and to be free in the second direction 16, a second element for the transmission of rotational movement 18 which is configured to be driven in rotation by the shaft 14 in the second direction 16 and to be free in the first direction 15, a first connecting rod 19 which is connected to the plate 12 by a first pivot connection 74 and which is connected to the first element for the transmission of rotational movement 17 by a second pivot connection 71 which is offset to the axis of rotation of the first element for the transmission of rotational movement 17, a second connecting rod 21 which is connected to the plate 12 by a third pivot connection 75 and which is connected to the second element for the transmission of rotational movement 18 by a fourth pivot connection 72 which is offset to the axis of rotation of the second element for the transmission of rotational movement 18, and a connecting element 22 having at least two degrees of rotational freedom between the plate 12 and the chassis 11. The shaft 14 which is connected to the rotor may be fixed to the rotor or even connected to the rotor by a coupling element such as a clutch.

The first element for the transmission of rotational movement 17 comprises a first freewheel. The second element for the transmission of rotational movement 18 comprises a second freewheel. These freewheels are mounted so that when the shaft 14 rotates in the first direction 15 the first element for the transmission of rotational movement 17 is driven whilst the second element for the transmission of rotational movement 18 is not driven. Moreover, when the shaft 14 rotates in the second direction 16, it drives the second element for the transmission of rotational movement 18 but not the first element for the transmission of rotational movement 17. The use of freewheels in the elements for the transmission of rotational movement 17, 18 makes it possible to select the driving of the elements for the transmission of rotational movement 17 or 18 by means of a single motor shaft 14.

For each of the elements for the transmission of rotational movement 17, 18 which are driven in one direction and free in the opposing direction, a solution of coupling and uncoupling by means of a freewheel system, for example by two notched wheels opposing one another, is conceivable. The first notched wheel is fixed to the rotating shaft of the element 17, 18 and it is mobile within the axis. The opposing notched wheel is fixed to the part having a single direction of rotation. In one direction of rotation the notched wheels jump from the teeth without transmitting the rotation, in the other direction they mesh together and transmit the rotational movement. Any other type of factory-made freewheel may be used, for example having a roller or cam.

In the embodiment shown in FIG. 1, the positioning device 10 comprises a first finger 51 which is fixed to the first element for the transmission of rotational movement 17 extending substantially parallel to the axis of rotation of the element 17. The positioning device comprises a second finger 52 which is fixed to the second element for the transmission of rotational movement 18 extending substantially parallel to the axis of rotation of the element 18.

The first connecting rod 19 extends substantially perpendicular to the first finger 51 and is pivotably connected to the first finger 51. The second connecting rod 21 extends substantially perpendicular to the second finger 52 and is pivotably connected to the second finger 52.

The positioning device according to the invention is based on the use of a single motor. The motor is a rotating actuator in order to orientate the plate 12 along two axes. The two directions of rotation 15, 16 of the motor 13 are used to select the axis of orientation which is desired to be activated.

The plate 12 may comprise two fingers. Each of the connecting rods 19, 21 is connected to a finger 24, 25 by a pivot connection 74, 75 at one of the ends thereof. At the other end, each of the connecting rods 19, 21 is connected to a finger 51, 52 by a pivot connection 71, 72 which is fixed to an element for the transmission of rotational movement 17, 18. The connecting element 22 is connected to the plate 12 by fixing elements 23, on the one hand, and by a connection having at least two degrees of rotational freedom relative to the chassis 11, on the other hand.

When the motor shaft 14 rotates in the first direction 15, the first element for the transmission of rotational movement 17 rotates in the first direction and drives the finger, which is fixed at that point, in the same direction of rotation 15. The first connecting rod 19 which is pivotably connected to the finger 51 which is fixed to the first element 17 and to the finger 24 which is fixed to the plate 12, from its position shown in FIG. 1 follows the movement of the finger 51 which is fixed to the first element 17 and drives the plate 12 in the region of the finger 24 (i.e. pulls the plate). The second element for the transmission of rotational movement 18 is mounted on the shaft 14 and is free in the direction of rotation 15. The second connecting rod 21 is not set in motion.

Conversely, when the motor shaft 14 rotates in the second direction of rotation 16, the first element for the transmission of rotational movement 17 is mounted on the shaft 14 and is free in the direction of rotation 16. The first connecting rod 19 is not set in motion. The second element for the transmission of rotational movement 18 rotates in the second direction of rotation 16 and drives the finger 52, which is fixed at that point, in the same direction of rotation 16. The second connecting rod 21 which is pivotably connected to the finger 52 which is fixed to the second element 18 and to the finger 25 which is fixed to the plate 12, from its position shown in FIG. 1 follows the movement of the finger 52 which is fixed to the first element 18 and drives the plate 12 in the region of the finger 25 (i.e. pushes the plate). It should be noted that the terms "pull" and "push" are used to facilitate comprehension. The movement carried out by the connecting rods 19, 21 on the plate in the region of the fingers 24, 25 depends on the position of the fingers 51, 52 which are fixed to the elements 17, 18 relative to the motor shaft 14. When a finger (51 or 52) which is fixed to an element (17 or 18) approaches the plate 12 by being displaced in rotation, the associated connecting rod pushes the plate 12 and when the finger (51 or 52) moves away from the plate 12 by being displaced in rotation, the associated connecting rod pulls on the plate 12.

Since the connecting element 22 is connected to the plate 12 by fixing elements 23, on the one hand, and by a double pivot connection (superimposed) relative to the chassis, on the other hand, it blocks the translational movements of the plate 12 and permits the rotations of the plate to be carried out according to the rotations of the motor shaft 14. The connecting element 22 may, for example, be a finger ball joint or universal joint.

It should be noted that the embodiment shown in FIG. 1 is applicable, in particular, for carrying out a type of movement for opening a shroud. When a first element for the transmission of rotational movement 17 is sufficiently close to the end of the shaft 14, the finger which is fixed at that point may carry out a rotation of 360° about the shaft. The second element for the transmission of rotational movement 18 is in turn not able to carry out a complete rotation of 360°. For this reason, the positioning of the plate 12 is limited in its range of possible positions but may be perfectly capable of displacing the plate between certain predefined positions. The connecting rod 21 may be connected to a different member from the plate 12, for example a shroud or a locking system.

Figure 2:
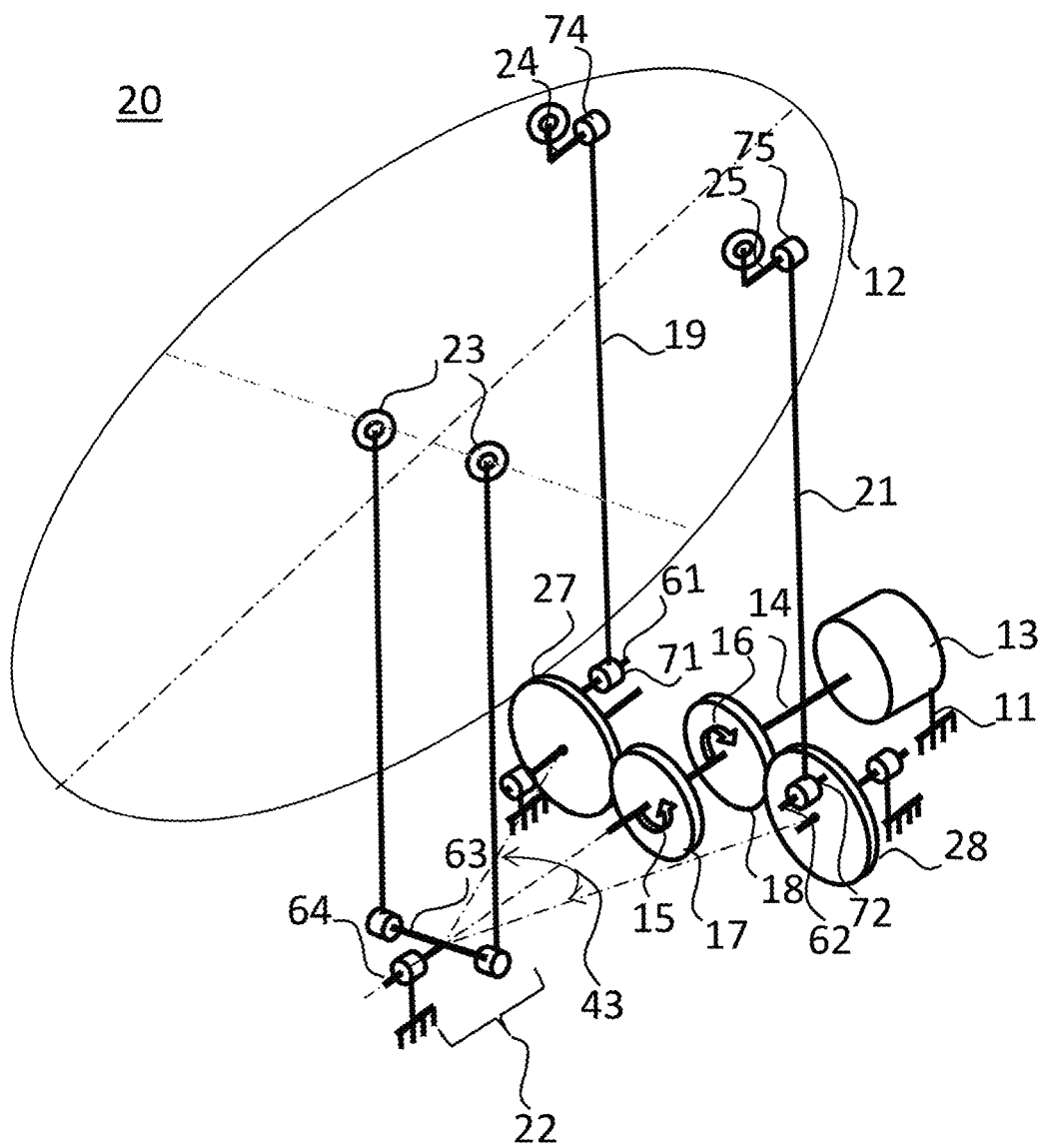
FIG. 2 shows a further embodiment of a positioning device according to the invention.

FIG. 2 shows a further embodiment of a positioning device 20 according to the invention. The positioning device 20 shown in FIG. 2 is almost identical to the positioning device 10 shown in FIG. 1. The positioning device 20 further comprises a third element for the transmission of rotational movement 27 which is connected to the first element for the transmission of rotational movement 17 such that the rotation of the first element for the transmission of rotational movement 17 in the first direction 15 drives the third element for the transmission of rotational movement 27 in rotation without driving in rotation the second element for the transmission of rotational movement 18, and a fourth element for the transmission of rotational movement 28 which is connected to the second element for the transmission of rotational movement 18 such that the rotation of the second element for the transmission of rotational movement 18 in the second direction 16 drives the fourth element for the transmission of rotational movement 28 in rotation without driving the first element for the transmission of rotational movement 17 in rotation. The first connecting rod 19 connects the plate 12 to the first element for the transmission of rotational movement 17 by means of the third element for the transmission of rotational movement 27 and the second connecting rod 21 connects the plate 12 to the second element for the transmission of rotational movement 18 by means of the fourth element for the transmission of rotational movement 28.

In the embodiment shown in FIG. 2, the positioning device 20 comprises the first finger 61 which on this occasion is fixed to the third element for the transmission of rotational movement 27 (and no longer to the first element 17) extending substantially parallel to the motor shaft 14. The positioning device comprises the second finger 62 which on this occasion is fixed to the fourth element for the transmission of rotational movement 28 (and no longer to the second element 18) extending substantially parallel to the motor shaft 14.

In a similar manner to the positioning device 10 shown in FIG. 1, the first connecting rod 19 extends substantially perpendicular to the first finger 61 and is pivotably connected to the first finger 61. The second connecting rod 21 extends substantially perpendicular to the second finger 62 and is pivotably connected to the second finger 62.

In this configuration, the two fingers 61 and 62 which are connected to connecting rods 19, 21 may carry out a complete rotation of 360° about their axis of rotation. The connecting rods 19, 21 are disengaged from the motor shaft. This has the result that in the case of a single motor 13 it is possible to orientate the plate 12 in the two axes of rotation defined by the two axes 63, 64 of the connecting element 22 defining the two degrees of rotational freedom.

According to a variant of the invention, the third element for the transmission of rotational movement 27 may have a first reduction ratio relative to the first element for the transmission of rotational movement 17 and the fourth element for the transmission of rotational movement 28 may have a second reduction ratio relative to the second element for the transmission of rotational movement 18.

Advantageously, the first reduction ratio of the third element 27 relative to the first element 17 is greater than 1 and the second reduction ratio of the fourth element 28 relative to the second element 18 is greater than 1. This permits a greater precision in the positioning of the plate 12.

Advantageously, the first reduction ratio and the second reduction ratio are identical in order to permit a less complex control law for positioning the plate.

In the embodiment shown in FIG. 2, the first and the third elements for the transmission of rotational movement 17, 27 are pinions, the third element for the transmission of rotational movement 27 meshing with the first element for the transmission of rotational movement 17 such that the rotation of the first element for the transmission of rotational movement 17 in the first direction 15 drives the third element for the transmission of rotational movement 27 in rotation. In the embodiment shown in FIG. 2, the element for the transmission of rotational movement 27 is then driven in rotation in the second direction 16. However, the invention also encompasses any embodiment including one or more intermediate pinions between the element 17 and the element 27, in which case the element for the transmission of rotational movement 27 could either be driven in the first direction 15 or in the second direction 16.

The second and the fourth elements for the transmission of rotational movement 18, 28 are pinions, the fourth element for the transmission of rotational movement 28 meshing with the second element for the transmission of rotational movement 18 such that the rotation of the second element for the transmission of rotational movement 18 in the second direction (16) drives the fourth element for the transmission of rotational movement (28) in rotation. In the embodiment shown in FIG. 2, the element for the transmission of rotational movement 28 is then driven in rotation in the first direction 15. However, the invention also encompasses any embodiment including one or more intermediate pinions between the element 18 and the element 28, in which case the element for the transmission of rotational movement 28 could either be driven in the first direction 15 or in the second direction 16.

In FIG. 2, the pinions 17, 27 and 18, 28 are shown in a conventional manner with parallel axes. The invention also relates to pinions with concurrent axes. Similarly, any type of toothing may be considered: linear toothings, helicoidal toothings, etc. such that the rotation of the element 17, respectively 18, transmits the rotational movement to the element 27, respectively 28.

Figure 3:
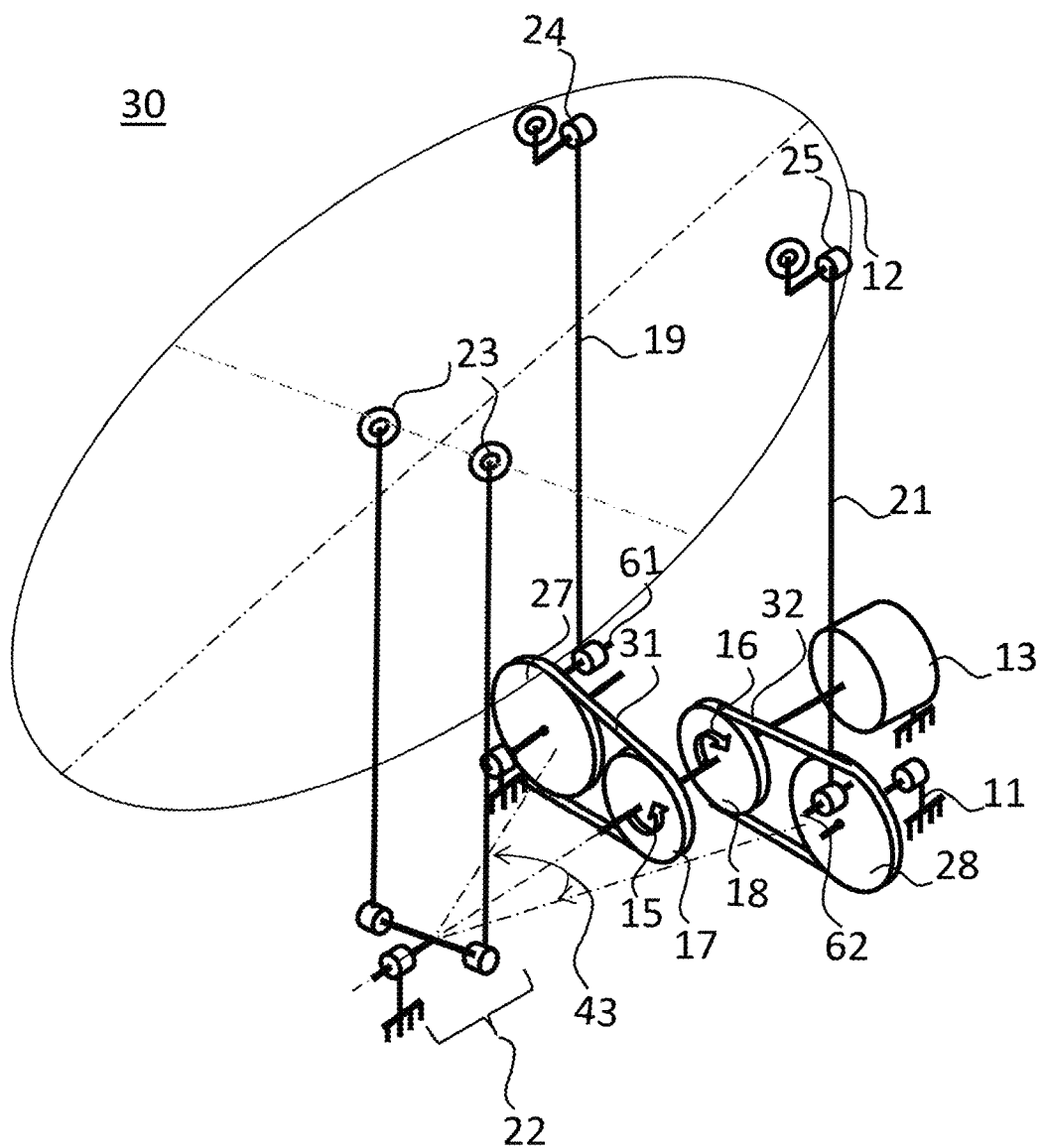
FIG. 3 shows a further embodiment of a positioning device according to the invention.

FIG. 3 shows a further embodiment of a positioning device 30 according to the invention. The positioning device 30 shown in FIG. 3 is identical to the positioning device 20 shown in FIG. 2. The only difference relates to the elements for the transmission of rotational movement 17, 18, 27, 28.

In the embodiment of the positioning device 30, the first and the third elements for the transmission of rotational movement 17, 27 are pulleys, the third element for the transmission of rotational movement 27 being connected to the first element for the transmission of rotational movement 17 by a first belt 31, such that the rotation of the first element for the transmission of rotational movement 17 in the first direction 15 drives the third element for the transmission of rotational movement 27 in rotation in the first direction 15.

Moreover, the second and fourth elements for the transmission of rotational movement 18, 28 are pulleys, the fourth element for the transmission of rotational movement 28 being connected to the second element for the transmission of rotational movement 18 by a second belt 32, such that the rotation of the second element for the transmission of rotational movement 18 in the second direction 16 drives the fourth element for the transmission of rotational movement 28 in rotation in the second direction 16.

It should be noted that this embodiment may relate to pulleys connected by smooth belts or advantageously, for improved transmission of the movement, even toothed wheels connected to toothed belts.

As mentioned above for the positioning device 20, in the embodiment of the positioning device 30 the third element for the transmission of rotational movement 27 may have a first reduction ratio relative to the first element for the transmission of rotational movement 17 and the fourth element for the transmission of rotational movement 28 may have a second reduction ratio relative to the second element for the transmission of rotational movement 18.

Moreover, advantageously the first reduction ratio of the third element 27 relative to the first element 17 is greater than 1 and the second reduction ratio of the fourth element 28 relative to the second element 18 is greater than 1. This permits improved precision in the positioning of the plate 12.

Here once again the first reduction ratio and the second reduction ratio are advantageously identical in order to simplify the control law for positioning the plate 12.

Figure 4:
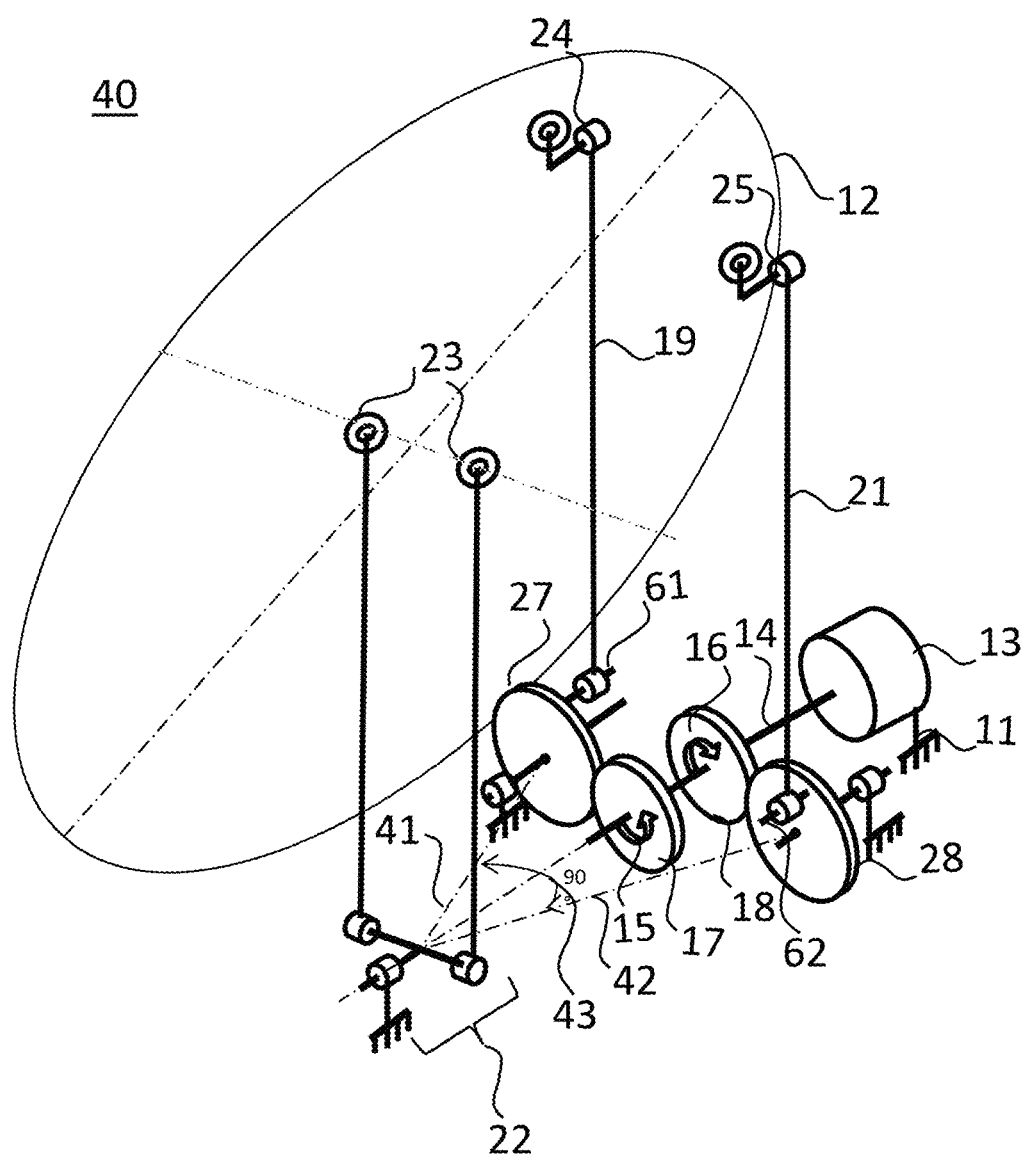
FIG. 4 shows a further embodiment of a positioning device according to the invention.

FIG. 4 shows a further embodiment of a positioning device 40 according to the invention. This positioning device 40 is identical to the positioning device 20 shown in FIG. 2. In this embodiment, a first axis 41 passing through the centre of the third element for the transmission of rotational movement 27 and the centre of the connecting element 22 and a second axis 42 passing through the centre of the fourth element for the transmission of rotational movement 28 and the centre of the connecting element intersect substantially perpendicular to one another. In other words, the angle 43 is equal to 90°. This makes it possible to facilitate the calculation of the laws for positioning the plate 12. More specifically, in this case, the mathematical transformations to be implemented are carried out within orthonormal references. However, it is possible that the angle 43 is not equal to 90°, in which case the laws of positioning take a more complex form.

Advantageously, the plate 12 extends substantially in one plane and a third axis substantially perpendicular to the first and second axes 41, 42 passing through the connecting element 22 intersects the plate 12 substantially at its centre. In other words, the connecting element 22 is located below the centre of the plate 12. This positioning of the universal joint permits optimal mobility of the plate 12.

A connecting element 22 which is offset relative to the centre of the plate 12 is also conceivable.

Figure 5:
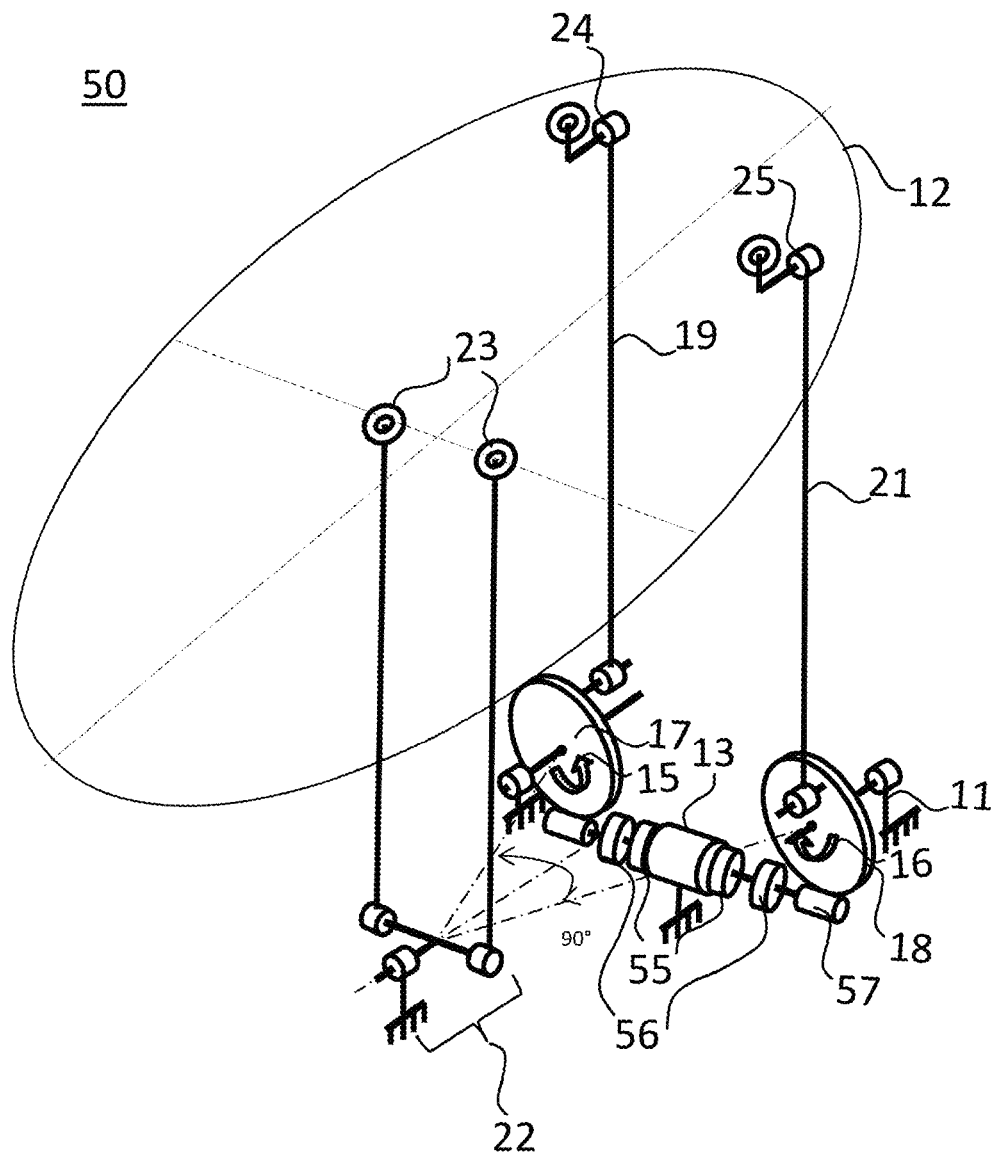
FIG. 5 shows a further embodiment of a positioning device according to the invention.

FIG. 5 shows a further embodiment of a positioning device 50 according to the invention. This positioning device 50 is similar in design to the positioning device 20 shown in FIG. 2. In this embodiment, the elements for the transmission of rotational movement 17, 18 are not mounted on the motor shaft 14. The motor shaft 14 extends on either side of the motor and the two sides of the motor shaft are used which makes it possible to rotate the motor shaft by 90° relative to the embodiment shown in FIG. 2. This arrangement makes it possible to cover the distance between the first and second elements for the transmission of rotational movement 17, 18. Two reducers 55 are required at the motor output (one on each side of the motor 13). Two freewheels 56 are located on each side of the motor 13 at the output of the reducers 55. The transmission between the motor shaft 14 and the first and second elements for the transmission of rotational movement 17, 18 is carried out respectively by the two pinions or endless screws 57. This configuration makes it possible to obtain a higher reduction ratio. For example, it is possible to reduce a first multiple between the motor 13 and the freewheel 56 with a ratio of 7. The motor step then becomes 5° which is more consistent for the freewheel 56, and then to implement a reduction ratio of 60. This also makes it possible to reduce the clearances of the freewheel ultimately seen on the instrument, for example a reflector. More specifically, a clearance of 0.5° is thus divided by 60, and then by 7 by all of the connecting rods. Finally, the reflector only sees 0.001°.

Figure 6:
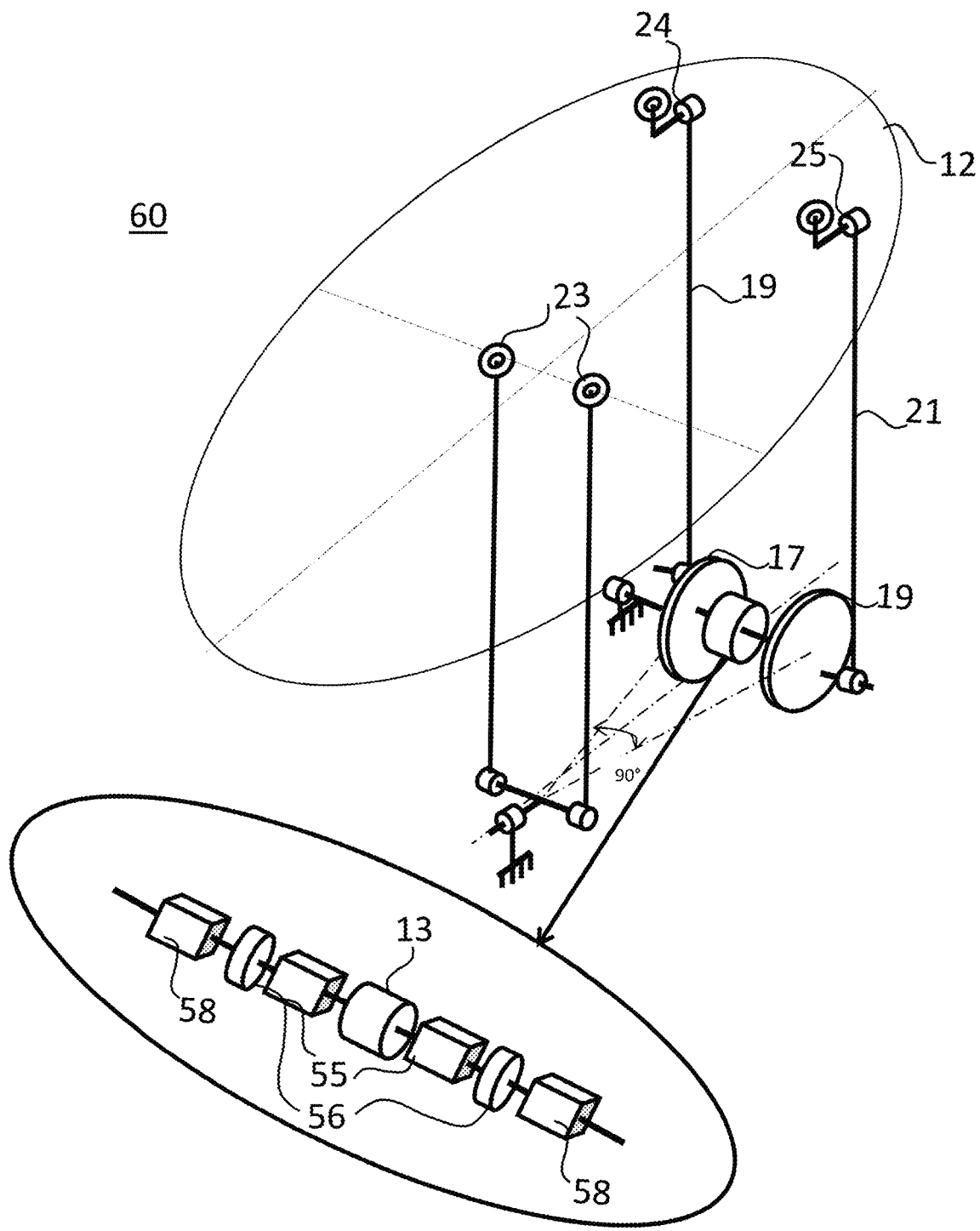
FIG. 6 shows a further embodiment of a positioning device according to the invention.

FIG. 6 shows a further embodiment of a positioning device 60 according to the invention. This positioning device 60 is similar in design to the positioning device 50 shown in FIG. 5. In this embodiment, the first and second elements for the transmission of rotational movement 17, 18 are oriented by 90° relative to those of the positioning device 50 so as to make the axes of the motor 13, the freewheels and the elements for the transmission of rotational movement 17, 18 coincide. All of the members are thus aligned and the reducers may be placed at carefully considered locations. In particular, the reducers 55 with a ratio of 7 may be placed between the motor 13 and the freewheel 56 and the reducer 58 with a ratio of 60 may be placed between the freewheel 56 and the element for the transmission of rotational movement 17 (or 18). This configuration has the advantage that the reducers used are available commercially and may be purchased from suppliers. This means that the dimensioning and lubrication of the reducers are carried out by the supplier. Moreover, only two bearings have to be provided for the two elements for the transmission of rotational movement 17, 18.

In FIGS. 1 to 6, the connecting rods 19 and 21, in addition to the connecting elements between the plate 12 and the connecting element 22, are shown in an elongated manner for ease of reading the figures. In practice, these elements are considerably shorter in order to lower the centre of gravity of the assembly and provide improved stability and also for reasons of weight and bulk.

The invention thus makes it possible to divide by two the number of motors, motor control circuit boards and cable strands relative to the devices known from the prior art which represents a gain in terms of costs, weight and restriction of deployment.

In the case of an application of the invention with an instrument of the reflector type on the plate, the rangefinding of the position of the reflector may be provided by rangefinding which is integrated in the motor, by counting the number of steps carried out in the first direction and the second direction by means of software (this is called relative rangefinding). Alternatively, the rangefinding may be implemented outside the motor and positioned, for example, in the region of the pivot connections of the connecting rods, by recording the controlled steps (this is called absolute rangefinding).

Moreover, the reduction ratio between the elements for the transmission of rotational movement (pinions or pulleys and belts) may make it possible to use a stepper motor which is less accurate and does not have a reducer, and thus is less expensive than a motor used in the devices of the prior art. Moreover, in the embodiments comprising the third and fourth elements for the transmission of rotational movement, the mechanical forces pass through the axes of the third and fourth elements for the transmission of rotational movement and not through the motor. It is thus possible to use a less powerful and thus less expensive motor.

Figure 7:
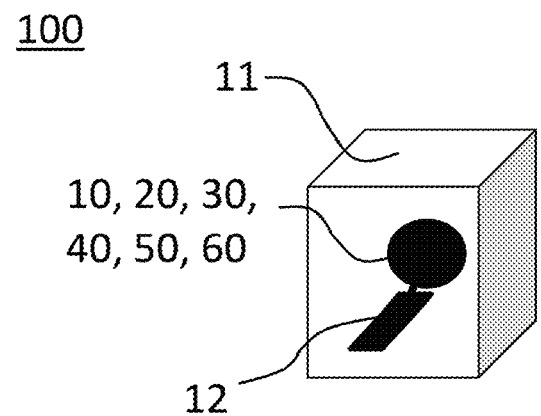
FIG. 7 shows space equipment comprising a positioning device according to the invention.

FIG. 7 schematically shows space equipment 100 comprising a positioning device 10, 20, 30, 40, 50, 60 according to the invention. The space equipment 100 may be a satellite, the platform thereof being used as a chassis for the positioning device 10, 20, 30, 40. The plate 12 may bear any instrument which has to be oriented in a predefined position.

The invention claimed is:

1. A positioning device comprising:
   a chassis,
   a plate to be positioned,
   a motor comprising a stator which is connected to the chassis and a rotor,
   a shaft which is connected to the rotor driven by the motor, which is mobile in rotation relative to the chassis in a first direction and in a second direction opposing the first direction,
   a first element for transmission of rotational movement which is configured to be driven in rotation by the shaft in the first direction and to be free in the second direction,
   a second element for transmission of rotational movement which is configured to be driven in rotation by the shaft in the second direction and to be free in the first direction,
   a first connecting rod which is connected to the plate by a first pivot connection and which is connected to the first element for transmission of rotational movement by a second pivot connection which is offset to a first axis of rotation, of the first element for transmission of rotational movement,
   a second connecting rod which is connected to the plate by a third pivot connection and which is connected to the second element for transmission of rotational movement by a fourth pivot connection which is offset to a second axis of rotation, of the second element, for the transmission of rotational movement, a connecting element having at least two degrees of rotational freedom between the plate and the chassis.

2. The positioning device according to claim 1, wherein the first element for transmission of rotational movement comprises a first freewheel and the second element for transmission of rotational movement comprises a second freewheel.

3. The positioning device according to claim 1, further comprising:
a third element for transmission of rotational movement which is connected to the first element for transmission of rotational movement such that the rotation of the first element for transmission of rotational movement in the first direction drives the third element for transmission of rotational movement in rotation,
a fourth element for transmission of rotational movement which is connected to the second element for transmission of rotational movement such that the rotation of the second element for transmission of rotational movement in the second direction drives the fourth element for transmission of rotational movement in rotation,
wherein the first connecting rod connects the plate to the first element for transmission of rotational movement by the third element for transmission of rotational movement and the second connecting rod connects the plate to the second element for transmission of rotational movement by the fourth element for transmission of rotational movement.

4. The positioning device according to claim 3, wherein the third element for transmission of rotational movement has a first reduction ratio relative to the first element for transmission of rotational movement and the fourth element for transmission of rotational movement has a second reduction ratio relative to the second element for transmission of rotational movement.

5. The positioning device according to claim 4, wherein the first reduction ratio and the second reduction ratio are identical.

6. The positioning device according to claim 1, wherein the connecting element is a finger ball joint.

7. The positioning device according to claim 3, wherein a third axis passing through a centre of the third element for transmission of rotational movement and a centre of the connecting element and a fourth axis passing through a centre of the fourth element for transmission of rotational movement and the centre of the connecting element intersect in a substantially perpendicular manner.

8. The positioning device according to claim 3, wherein the first and the third elements for transmission of rotational movement are pinions, the third element for transmission of rotational movement meshing with the first element for transmission of rotational movement such that the rotation of the first element for transmission of rotational movement in the first direction drives the third element for transmission of rotational movement in rotation.

9. The positioning device according to claim 3, wherein the second and the fourth elements for transmission of rotational movement are pinions, the fourth element for transmission of rotational movement meshing with the second element for transmission of rotational movement such that the rotation of the second element for transmission of rotational movement in the second direction drives the fourth element for transmission of rotational movement in rotation.

10. The positioning device according to claim 3, wherein the first and the third elements for transmission of rotational movement are pulleys, the third element for transmission of rotational movement being connected to the first element for transmission of rotational movement by a first belt such that the rotation of the first element for transmission of rotational movement in the first direction drives the third element for transmission of rotational movement in rotation in the first direction.

11. The positioning device according to claim 10, wherein the second and the fourth elements for transmission of rotational movement are pulleys, the fourth element for transmission of rotational movement being connected to the second element for transmission of rotational movement by a second belt such that the rotation of the second element for transmission of rotational movement in the second direction drives the fourth element for transmission of rotational movement in rotation in the second direction.

12. The positioning device according to claim 1, wherein the plate extends substantially in one plane and a third axis substantially perpendicular to the first axis and second axis passing through the connecting element intersects the plate substantially at its centre.

13. The positioning device according to claim 1, further comprising a space equipment configured to orientate the plate in a predefined position.

* * * * *